Patented June 5, 1934

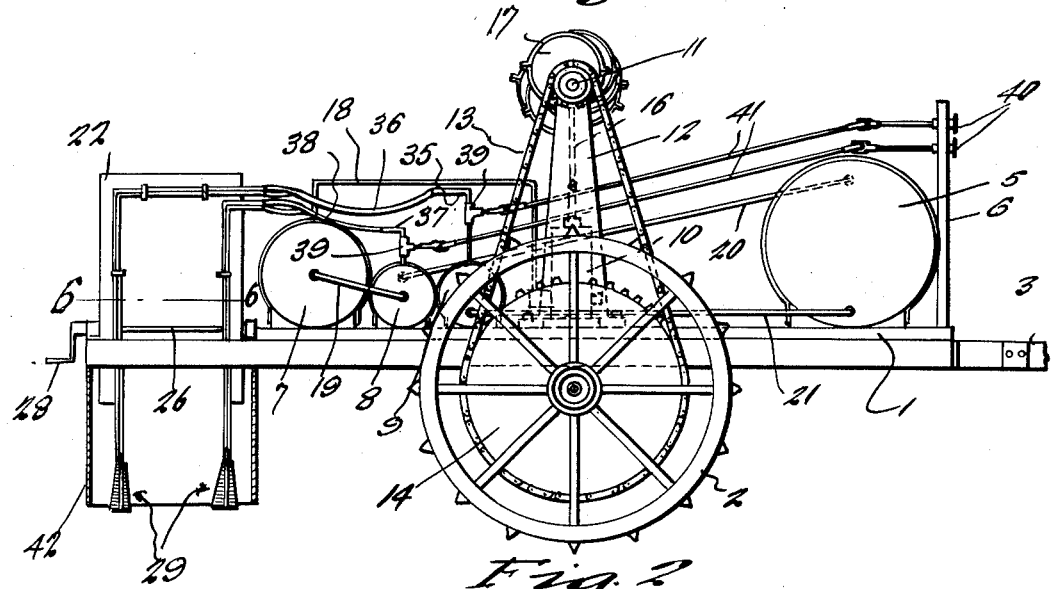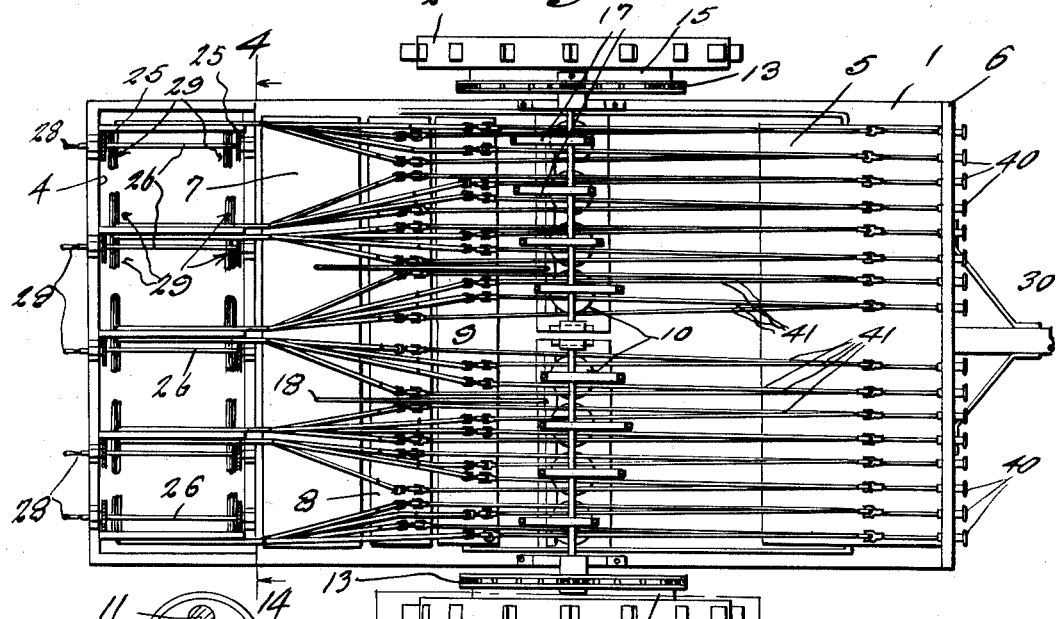

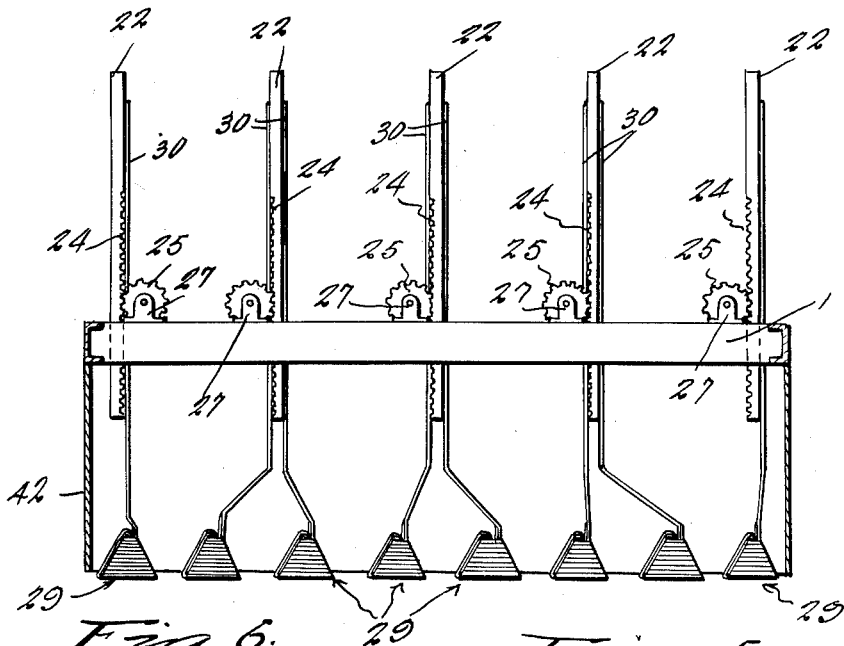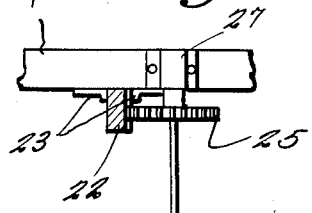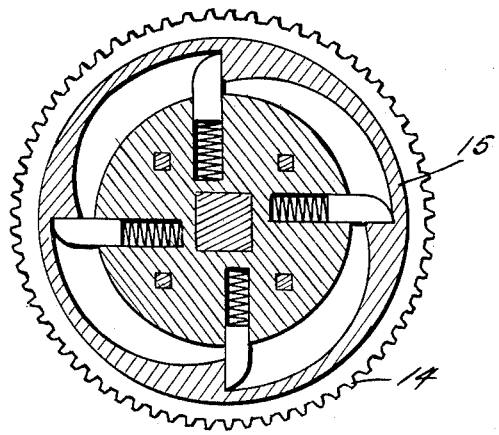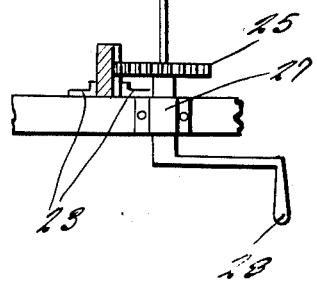

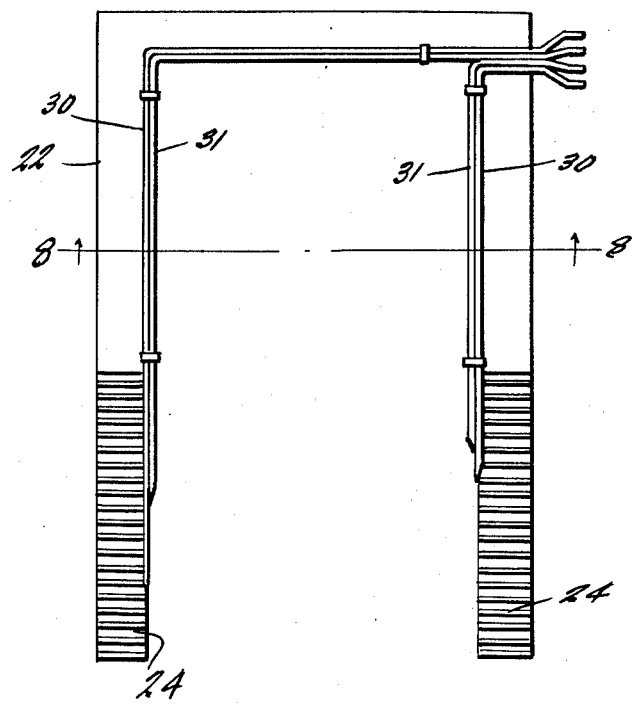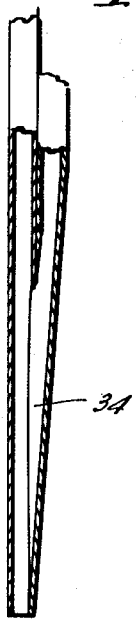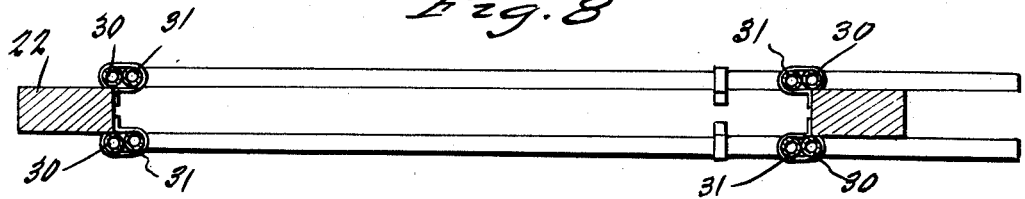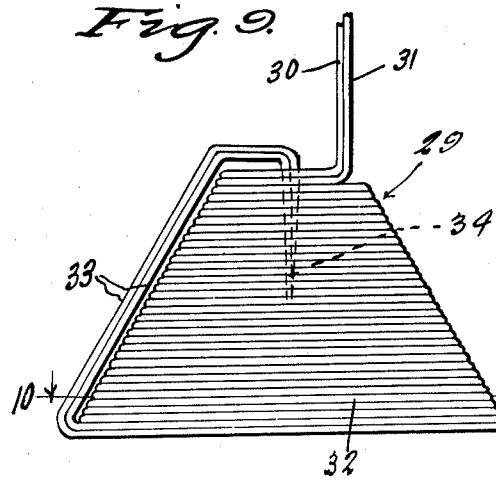

1,961,877

UNITED STATES PATENT OFFICE 1,961,877

SPRAYING OR BURNING MACHINE

Spiros Gars, Fresno, Calif.

Application November 25, 1932, Serial No. 644,391

2 Claims. (Cl. 126—271.2)

This invention is a spraying or burning machine which is intended particularly for use in preparing ground for cultivation and has for its primary object to provide, in a manner as hereinafter set forth, a machine of this character embodying a novel construction, combination and arrangement of parts through the medium of which the ground may be either sprayed or burned in a manner to eradicate weeds and other obnoxious vegetation and insects and their eggs, while at the same time enriching the ground in phosphorus from the flame.

Other objects of the invention are to provide a machine of the aforementioned character which will be simple in construction, strong, durable, highly efficient and reliable in use, light in weight, compact, and which may be manufactured and operated at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a spraying or burning machine constructed in accordance with the present invention.

Figure 2 is a view in top plan thereof.

Figure 3 is a detail view, showing the operating means for one of the pumps.

Figure 4 is a view in vertical transverse section, taken substantially on the line 4—4 of Figure 2.

Figure 5 is a view in vertical longitudinal section through one of the clutches, taken substantially on the line 5—5 of Figure 2.

Figure 6 is a detail view in horizontal section, taken substantially on the line 6—6 of Figure 1.

Figure 7 is an elevational detail view of one of the vertically adjustable burner supporting frames.

Figure 8 is a detail view in horizontal section, taken substantially on the line 8—8 of Figure 7.

Figure 9 is a detail view in elevation of one of the burners.

Figure 10 is a view in horizontal section through one of the burners, taken substantially on the line 10—10 of Figure 9.

Figure 11 is a detail view principally in vertical section through the discharge end portion of one of the burners.

Referring now to the drawings in detail, it will be seen that the embodiment of the invention which has been illustrated comprises a platform 1 which is mounted on a pair of supporting wheels 2, a tongue 3 projecting forwardly from said platform.

The platform 1 has an opening 4 extending across its rear portion for a purpose which will be presently set forth. A fuel tank 5 is mounted transversely on the forward portion of the platform 1 immediately to the rear of a panel 6 which rises from said platform.

On a rear portion of the platform 1, adjacent the opening 4, is an air storage tank 7. Comparatively small tanks 8 and 9 are mounted on the platform 1 forwardly of the storage tank 7.

A pair of transversely aligned series of air pumps 10 are mounted on the platform 1 between the supporting wheels 2. Each pump comprises a vertical cylinder with a piston mounted for reciprocation therein. Transversely aligned pump actuating shafts 11 are journalled in bearings provided therefor on the upper ends of standards 12 which rise from the platform 1.

Drive chains 13 are trained over sprockets fixed on the outer end portions of the shafts 11 and over comparatively large sprocket gears 14 which are operatively connected to the wheels 2 for actuation in one direction thereby through the medium of over-running or one-way clutches 15. Connecting rods 16 are operatively coupled to eccentrics 17 fixed on the shafts 11 for reciprocating the pistons in the cylinders of the pumps 10.

Suitable exhaust manifolds are provided for the series of pumps 10, each manifold being connected by a pipe 18 with the storage tank 7. Of course, suitable check valves may be provided if necessary between the pumps 10 and the storage tank 7. Further, a suitable safety valve for the storage tank 7 may be provided if desired. A pipe 19 connects the tank 8 with the storage tank 7 for receiving air under pressure therefrom. A pipe 20 connects the tank 8 with an upper portion of the fuel tank 5, while a pipe 21 extends from the lower portion of the fuel tank 5 to the tank 9.

Mounted for vertical adjustment in the opening 4 of the platform 1 are substantially U-shaped frames 22. The frames 22 are slidable between guides 23 which are provided therefor (see Figure 6). Racks 24 are provided on the lower portions of the legs of the frames 22 for engagement by gears 25 which are fixed on the end portions of shafts 26 which are journalled longitudinally in bearings 27 on the rear portion of the platform 1, said shafts traversing the opening 4. Hand cranks 28 are fixed on the rear end portions of the shafts 26 for manually raising or lowering the frames 22.

Mounted on each leg of each frame 22 and depending therefrom are burners which are designated generally by the reference numeral 29. Each burner 29 is formed of adjacent air and fuel pipes 30 and 31, respectively, which are coiled in a manner to provide a flared retort 32, said pipes extending upwardly adjacent one end of the retort 32, as at 33, and merging with each other in a down-turned discharge and mixing nozzle 34 (see Figures 9 and 11) which extends downwardly into the retort 32. It will thus be seen that the flame from the nozzle 34 will generate and preheat a highly inflammable gas in the retort 32.

Pipes 35 rise from the tank 9 and are connected to the pipes 30 by flexible conduits 36. Similar pipes 37 rise from the tank 8 and are connected by flexible conduits 38 to the pipes 31. Control valves 39 are provided in the pipes 35 and 37, said control valves being connected to adjusting knobs 40 on the upper portion of the panel 6 by rods 41.

In operation, the pumps 10 store air under pressure in the tank 7. The air under pressure enters the tank 8 from the tank 7 through the pipe 19. A portion of this air passes through the valve-controlled pipe 37, through the flexible conduit 38 into the air pipe 31 of the respective burners 29. A portion of the air passes from the tank 8 through the pipe 20 to the upper portion of the fuel tank 5 and forces the fuel from the tank 5 through the pipe 21 into the tank 9. From the tank 9, the fuel passes under pressure to the burners through the valve-controlled pipes 35 and the flexible conduits 36.

The burners 29 are so constructed and arranged as to direct flames with considerable force against the ground in a manner to penetrate said ground to a considerable depth, thereby enriching said ground in phosphorous in addition to entirely destroying obnoxious vegetation in a manner to leave little if any ash and also eradicating insects and their eggs.

A shield 42 depends from the rear portion of the platform 1 and substantially encloses the burners 29. As previously stated, the burners may be adjusted vertically as desired through the medium of the handcranks 38. Any suitable means, if necessary, may be provided for retaining the burner supporting frames 22 in adjusted position. Further, any suitable fuel may be used in the tank 5 when treating the ground by burning and any suitable liquid may be used when spraying.

It is believed that the many advantages of a spraying or burning machine constructed in accordance with the present invention will be readily understood, and although the preferred embodiment of the invention is as illustrated and described, it is to be understood that changes in the details of construction and in the combination and arrangement of parts may be resorted to which will fall within the scope of the invention.

What is claimed is:

1. A burning machine including a wheel supported frame, a plurality of inverted U-shaped members supported for vertical movement in the frame, a burner connected to the lower end of each limb of each U-shaped member, means for supplying a mixture of fuel and air to each burner and manually operated means for adjusting each member vertically.

2. A burning machine including a portable frame, a plurality of inverted U-shaped members supported for vertical movement in the frame, a burner connected with the lower end of each limb of each U-shaped member, means for supplying a mixture of air and liquid fuel to the burners, rack teeth on the limbs of said members, a plurality of shafts journaled in the frame, one for each U-shaped member, gears carried by each shaft for engaging the rack teeth of a member and a crank on each shaft for permitting the shaft to be turned by hand.

SPIROS GARS.